(12) United States Patent
Keating et al.

(10) Patent No.: US 9,007,377 B2
(45) Date of Patent: Apr. 14, 2015

(54) SYSTEM AND METHOD FOR DISPLAYING PARAMETER INDEPENDENCE IN A DATA ANALYSIS SYSTEM

(75) Inventors: Sean Patrick Keating, San Jose, CA (US); Evelyn McGown, Hillsborough, CA (US)

(73) Assignee: Molecular Devices, LLC, Sunnyvale, CA (US)

( * ) Notice: Subject to any disclaimer, the term of this patent is extended or adjusted under 35 U.S.C. 154(b) by 472 days.

(21) Appl. No.: 13/117,713

(22) Filed: May 27, 2011

(65) Prior Publication Data
US 2012/0299927 A1 Nov. 29, 2012

(51) Int. Cl.
G06F 19/00 (2011.01)
G06T 11/20 (2006.01)

(52) U.S. Cl.
CPC .............. G06F 19/30 (2013.01); G06T 11/206 (2013.01)

(58) Field of Classification Search
CPC G06T 11/206; G06T 7/0012; A61K 2300/00; A61K 45/06; A61K 31/4525; B01J 20/186; G06F 7/483; G06F 19/00; G06K 9/4604; G01N 33/48; G01N 33/40
USPC ......................................................... 345/440
See application file for complete search history.

(56) References Cited

U.S. PATENT DOCUMENTS

| | | | |
|---|---|---|---|
| 6,188,969 B1 * | 2/2001 | Minor | 702/86 |
| 6,404,501 B1 | 6/2002 | Hafeman et al. | |
| 2003/0200032 A1 | 10/2003 | Keating et al. | |
| 2003/0215156 A1 * | 11/2003 | Rieger | 382/276 |
| 2005/0287040 A1 | 12/2005 | Giebeler et al. | |
| 2006/0212274 A1 * | 9/2006 | Anderson et al. | 702/189 |
| 2007/0179753 A1 * | 8/2007 | Barajas et al. | 702/189 |
| 2007/0183931 A1 | 8/2007 | Stock et al. | |
| 2008/0299927 A1 * | 12/2008 | Tenbrook et al. | 455/226.2 |

OTHER PUBLICATIONS

Paul G. Gottschalk, John R. Dunn, "The five-parameter logistic: A characterization and comparison with the four-parameter logistic", Analytical Biochemistry, May 23, 2005, Bra vol. 343, Issue 1, p. 54-65, http://www.sciencedirect.com/science/article/pii/S0003269705003313.*

Angus M. Brown, "A step-by-step guide to non-linear regression analysis of experimental data using a Microsoft Excel spreadsheet", Jun. 2001, COmputer Methods and Prgrams in Biomedicine, vol. 66, Issue 3, pp. 191-200, http://www.sciencedirect.com/science/article/pii/S0169260700001243;http://link.springer.com/article/10.1007/BF01061732.*

Peter Veng Pedersen, Curve Fitting and Modeling in Pharmacokinetics and Some Practical Experience with NONLIN and a New Program FUNFIT, Apr. 26, 1977, Journal of Pharmacokinetics and Biopharmaceutics, vol. 5, No. 5.*

(Continued)

*Primary Examiner* — Mark Zimmerman
*Assistant Examiner* — Sarah Le
(74) *Attorney, Agent, or Firm* — Bella Fishman (57) ABSTRACT

A system for performing a data analysis is provided. The system includes a curve fit module that determines a curve fit function for a data set. A parameter dependence determination module determines a dependence value for a parameter of the curve fit function. A parameter independence determination module determines an independence value for the parameter of the curve fit function based on the dependence value for the parameter. A graphical indicator generation module generates a graphical indicator for the parameter. The graphical indicator corresponds to the independence value for the parameter.

20 Claims, 4 Drawing Sheets

(56) References Cited

OTHER PUBLICATIONS

John W.A. Findlay and Robert F. Dillard, "Appropriate Calibration Curve Fitting in Ligand Binding Assays", Jun. 2007, The AAPS Journal, vol. 9, Issue 2, pp. E260-E267;http://physiologie.envt.fr/spip/IMG/pdf/logistic_assay_findlay_review.pdf.*

GraphPad, Nonlinear regression: Dependency and ambiguous fits, Jan. 1, 2009, GraphPad Software, Inc, http://www.graphpad.com/support/faqid/931/.*

Gorski-Popiel, J. "Classical sensitivity-A collection of formulas." Circuit Theory, IEEE Transactions on 10.2 (1963): 300-302.* http://www.graphpad.com/faq/viewfaq.cfm?faq=1462 , Mar. 23, 2009.

* cited by examiner

SYSTEM AND METHOD FOR DISPLAYING PARAMETER INDEPENDENCE IN A DATA ANALYSIS SYSTEM

FIELD OF THE INVENTION

This invention relates to data analysis systems and more particularly to data analysis systems configured to perform regression analysis.

BACKGROUND

Researchers commonly utilize biological assays (bioassays) during drug discovery research to measure the pharmacological effects on biological matter of substances at increasing concentrations. The pharmacological effects of a substance at increasing concentrations may be quantified as dose-response values that correspond to respective dose concentrations. Data analysis of the dose-response data may include plotting the dose-response values against the dose concentrations and using regression (e.g., least squares regression) to identify a curve that "best" fits to the dose-response data (i.e., curve fitting). A parameterized curve fit function may correspond to the curve that "best" fits to the dose-response data, and regression analysis may provide estimates for the values of the parameters of the curve fit function. Regression analysis may also provide values for standard error and the confidence intervals of the curve fit function parameters.

In some circumstances, although the identified dose-response curve or curve fit function may be the "best" fit for the dose-response data, one or more parameters of the curve fit function may not be reliable, having relatively high values for the standard error and the confidence interval width. Unreliable parameters may indicate, for example, that a particular curve fit function is not a good choice for the dose-response data, or that there is an insufficient amount of dose-response data.

Researchers, however, may not appreciate the significance of high values for standard error and the confidence interval width of a parameter of the curve fit function. As a result, researchers may fail to recognize that one or more parameters of the curve fit function are unreliable.

Therefore, a need exists for indicating the reliability of the parameters of a curve fit function during data analysis.

SUMMARY

A system for performing a data analysis is provided. The system includes a curve fit module that determines a curve fit function for a data set. A parameter dependence determination module determines a dependence value for a parameter of the curve fit function. A parameter independence determination module determines an independence value for the parameter of the curve fit function based on the dependence value for the parameter. A graphical indicator generation module generates a graphical indicator for the parameter. The graphical indicator corresponds to the independence value for the parameter.

A method for performing a data analysis is also provided. The method includes determining a curve fit function for a data set and determining a dependence value for a parameter of the curve fit function. An independence value for the parameter of the curve fit function is also determined based on the dependence value for the parameter. A graphical indicator for the parameter is generated where the graphical indicator corresponds to the independence value for the parameter.

A computer program product for performing data analysis is additionally provided. The computer program product includes instructions that may be executed by a processing module of an electronic system. When the processing module executes the instructions, the computer program product directs the electronic system to determine a curve fit function for a data set. The computer program product also directs the electronic system to determine a dependence value for a parameter in the curve fit function and an independence value for the parameter based on the dependence value for the parameter. The computer program product further directs the electronic system to generate a graphical indicator for the parameter that corresponds to the independence value for the parameter.

BRIEF DESCRIPTION OF THE DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A system and method for determining and displaying parameter independence in a data analysis system are provided. The system will be described in the context of an assay data analysis system for analyzing bioassay dose-response data. It will be understood, however, that the principles shown and described are fully applicable to additional and alternative types of data analysis systems for analyzing additional and alternative types of data.

Data analysis may fit data (e.g., dose-response data) to a curve using, for example, least squares regression. Bioassays may generate dose-response data that best fits to a sigmoidal (S-shaped) curve in which dose responses increase rapidly over relatively small changes in the concentration. Sigmoidal dose-response curves include a lower plateau (minimum asymptote) and an upper plateau (maximum asymptote). The lower plateau represents the dose-response values where the concentration is very small (i.e., near zero). The upper plateau represents the dose-response values where the concentration is very large (i.e., near infinity). Sigmoidal dose-response curves may also be described by the slope (or steepness) of the curve. The slope of the curve may be referred to as the Hill coefficient. The dose-response curve may also indicate which concentration results in half of the maximum response; this concentration may be referred to as the EC50 (half maximal effective concentration). The EC50 of a sigmoidal does-response curve may be located at the inflection point of the curve. The inflection point of a sigmoidal curve is the point halfway between the minimal asymptote and the maximum asymptote at which the curvature changes directions from being downwardly concave to being upwardly concave.

The sigmoidal dose-response curve may correspond to, for example, a four-parameter logistic (4PL) or a five-parameter logistic (5PL) curve function. A 4PL curve fit function for a sigmoidal curve is symmetric around its inflection point whereas a 5PL curve fit function for a sigmoidal curve is asymmetric. Accordingly, a 5PL curve fit function for a sigmoidal curve includes an asymmetry parameter that corresponds to the asymmetry of the curve.

A 4PL curve fit function for a sigmoidal curve may have the following equation:

$$y = D + \frac{A - D}{1 + \left(\frac{x}{C}\right)^B}$$

A 5PL curve fit function for a sigmoidal curve may have the following equation:

$$y = D + \frac{A - D}{\left\{1 + \left(\frac{x}{C}\right)^B\right\}^R}$$

In these equations, the parameters correspond to the characteristics of the sigmoidal curves discussed above. In particular, parameter A corresponds to the value of the minimum asymptote of the dose-response curve; parameter B is a slope factor and corresponds to the slope of the dose-response curve; parameter C in the 4PL function corresponds to the inflection point of the dose-response curve; parameter D corresponds to the value of the maximum asymptote of the dose-response curve; and parameter G corresponds to the asymmetry factor of the dose-response curve in the 5PL curve fit function.

Regression analysis may estimate values for the parameters of the 4PL curve fit function and 5PL curve fit function. Whether the resulting function is a suitable fit for the dose-response data may depend, however, on the reliability of the parameters used in the function. Unreliable parameters may indicate that there is a problem with, for example, the particular curve fit for the dose-response data, the quality or amount of dose-response data, or the bioassay itself. An insufficient amount of dose-response data or relatively "noisy" data may result in unreliable parameters. For example, the dose-response data may lack data points in the asymptotic regions where the concentration value, x, is much less than the inflection point ($x \ll C$) or much greater than the inflection point ($x \gg C$). The lack of a sufficient amount of dose-response data may be the result of too few trials or perhaps a design flaw in the bioassay itself. In this example, the curve fit for the dose-response data may be unreliable due to large values for the standard error and confidence interval width of the minimal asymptote, A; the maximal asymptote, D; or the inflection point, C. A related problem exists when using a 5PL curve fit logistic function with noisy data. In this case, the noisy data may result in a coupling between the slope of the curve, B; parameter C; and the asymmetry factor, G, such that the estimates for these parameters are unreliable. As discussed above, however, researchers may fail to notice the large values for the standard errors and confidence interval widths or may fail to recognize the significance and implication of these values.

Figure 1:
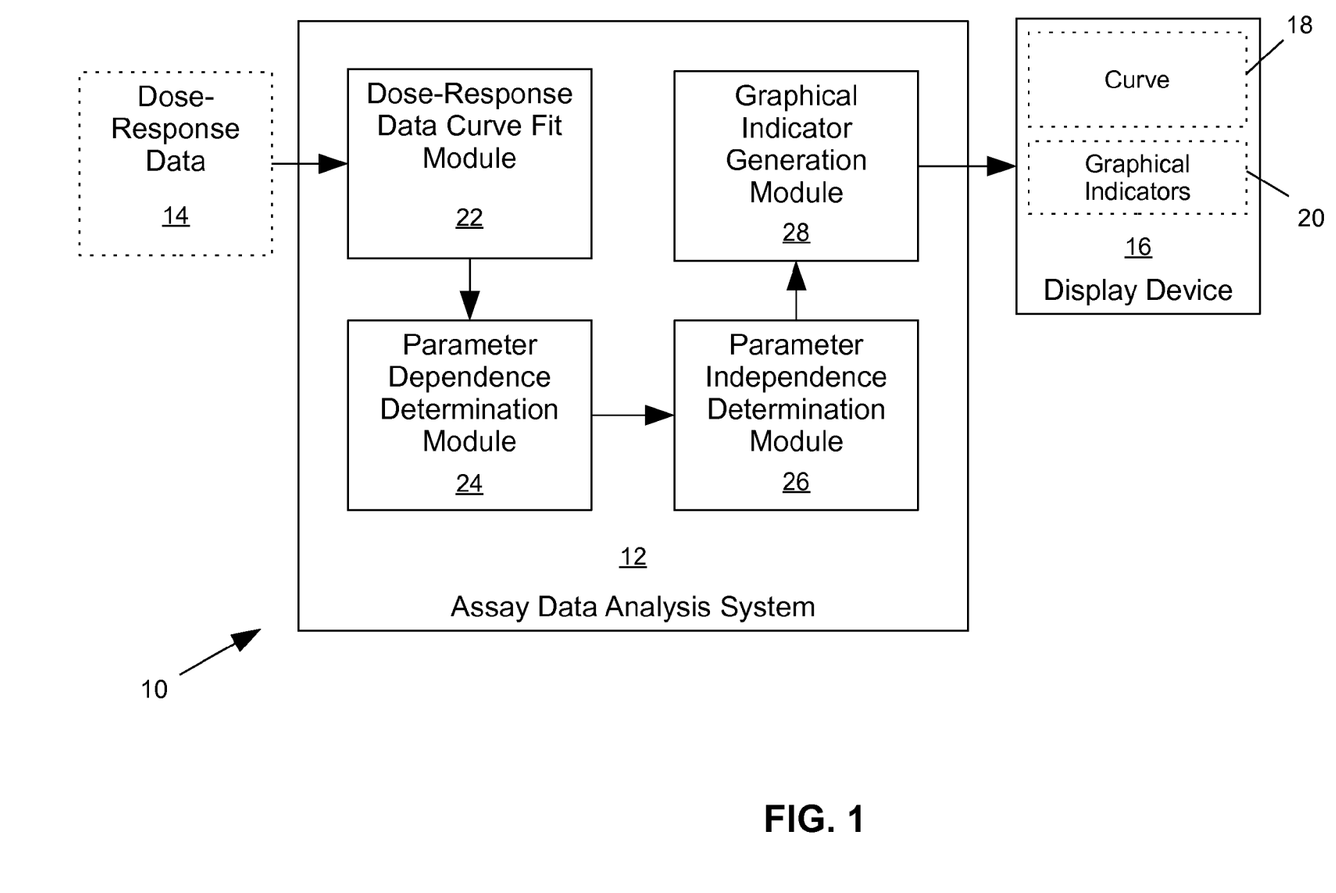
FIG. 1 is an example of an implementation of a system for displaying parameter independence in a data analysis system.

Referring now to FIG. 1, a system 10 for determining and displaying parameter independence is shown. In this example, the system 10 includes a computer-implemented data analysis system 12. The data analysis system 12 in the example shown in FIG. 1 is an assay data analysis system for analyzing assay data. In particular, the assay data analysis system 12 in FIG. 1 analyzes, by way of example, dose-response data 14 collected from bioassays. The assay data analysis system 12 may be in signal communication with a display device 16 for displaying the curve fit 18 for the dose-response data 14 and the graphical indicators 20 of parameter independence.

As seen, the system 10 alerts researchers to the existence of unreliable parameters in the dose-response curve fit functions. In particular, the system 10 may alert researchers to potential problems with a particular curve fit, the dose-response data, or the bioassay itself. Having been alerted to potential problems, researchers may, for example, re-analyze the dose-response data to assess whether a different curve fit is better suited for the dose-response data; perform additional bioassays to collect more dose-response data; or assess the bioassay itself for any design flaws. The system 10 alerts researchers to the existence of unreliable parameters by providing a graphical indicator 20 of parameter independence of the parameters of the curve fit function.

The assay data analysis system 12 in the example seen in FIG. 1 includes: a curve fit module 22; a parameter dependence determination module 24; a parameter independence determination module 26; and a graphical indicator generation module 28.

The curve fit module 22 performs regression analysis (e.g., least squares regression) and fits the dose-response data 14 to a curve. The curve fit module 22 also determines a curve fit function for the curve. The curve fit module 22 may determine that the dose-response data 14 best fits to a sigmoidal curve defined by a 4PL curve fit function or 5PL curve fit function. The curve fit module 22 may estimate the values for the parameters (A, B, C, D, and G) for the curve fit function as well as calculate the standard error and confidence interval for each parameter.

Once the curve fit module 22 provides the estimated values for the parameters of the curve fit function, the parameter dependence determination module 24 may determine a dependence value for each of the parameters of the curve fit function. Parameter dependence relates to the degree to which the variance in a parameter is the result of an interaction between one parameter of the curve fit function and another parameter of the curve fit function, i.e., the degree to which one parameter depends on another parameter.

For example, adjusting a parameter of the curve fit function may move the corresponding curve away from the data points in the data set. But if the adjusted parameter is dependent upon other parameters, it may be possible to move the curve back towards the data points by adjusting one or more of the other parameters of the curve fit function. If the adjusted parameter is not dependent upon the other parameters of the curve fit function, however, it may not be possible to move the curve back towards the data points.

Parameter dependence may be quantified for each parameter of the curve fit function as a numerical value between 0.0 and 1.0 (inclusive). A low dependence value (e.g., near 0.0) indicates that a parameter is not dependent upon other parameters of the curve fit function. A high dependence value (e.g., near 1.0) indicates that a parameter is dependent upon one or more parameters of the curve fit function.

The parameter dependence determination module 24 in FIG. 1 determines the dependence value, d, for each parameter of the curve fit function from the best-fit value and the for each respective parameter. The curve fit module 22 may provide the best-fit value and the variance ($VAR_{best}$) for each of the parameters of the curve fit function where all parameters are adjustable (i.e., where no parameter is fixed).

The parameter dependence determination module 24 then selects a parameter of the curve fit function for which to calculate the parameter dependence value. The parameter dependence determination module 24 fixes the other (non-selected) parameters of the curve fit function at their best values and performs a regression analysis on the selected parameter to fit the selected parameter to a curve. In this case, only the selected parameter is adjustable; the other parameters are fixed at their best-fit values. While the best-fit value for the selected parameter will not change for the resulting curve, its variance ($VAR_{selected}$) will decrease.

The parameter dependence determination module 24 then calculates the dependence value, d, for the selected parameter thus:

$$d = 1 - \frac{VAR_{selected}}{VAR_{best}}$$

The parameter dependence determination module 24 calculates the dependence value, d, for each parameter of the curve fit function by selecting each parameter of the curve fit function and performing the steps described above. GraphPad Prism®, available from GraphPad Software, Inc. of La Jolla, Calif., may be used to determine parameter dependence values.

The parameter independence determination module 26 of FIG. 1 then determines an independence value, s, for each parameter. The independence values for the parameters of the curve fit function are based on the respective parameter dependence values, d, for the parameters. The parameter independence determination module 26 transforms a parameter dependence value, d, to a corresponding independence value, s, using a transformation function. The transformation function uses the dependence value, d, and a sensitivity factor, b, to transform the dependence value into the independence value. A suitable transformation function may be as follows:

$$s(d) = (1-d) \times \left(\frac{1+b}{1+b-d}\right)$$

The transformation function is designed such that the parameter independence determination module 26 transforms the dependence value into an independence value in a nonlinear fashion. The sensitivity factor, b, is a predetermined numerical constant and may be chosen based on a predetermined threshold. The predetermined threshold may be the value at which dependence value, d, is considered to be reliable or unreliable. Where the dependence value is above the threshold, the dependence value, d, may be considered unreliable and the transformation function transforms the dependence value into a relatively small independence value, s. Where the dependence value is below the threshold, the dependence value, d, may be considered reliable, and the sensitivity factor, b, boosts the resulting independence value, s, such that the independence value is relatively large. In this way, the independence value, s, is suitable for a mapping to a corresponding graphical indicator.

For example and as discussed further below, the graphical indicator may be a signal-strength indicator where the number of bars in the signal-strength indicator corresponds to the independence value, s. For bioassays, 0.99 may be the threshold for identifying unreliable and reliable parameters. Thus, parameters where d>0.99 may be considered unreliable, and parameters where d<0.99 may be considered reliable. Accordingly, where d>0.99, the graphical indicator generation module 28 maps the transformed independence value, s, to a small number of bars in the signal-strength indicator to indicate that the parameter is unreliable. Similarly, where d<0.99, the graphical indicator generation module 28 maps the transformed independence value to a large number of bars to indicate that the parameter is reliable. In order to achieve this, the sensitivity factor, b, is chosen to significantly boost the transformed independence value, s, when d<0.99. In order to boost independence values when d<0.99, the sensitivity factor may be, in this example, b=0.01. In this way, the independence value, s, is relatively large when d<0.99 and may be mapped to a large number of bars in the signal-strength indicator. Similarly, when d>0.99 and b=0.01, no boost is observed for the resulting independence value, s, which may thus be mapped to a relatively small number of bars.

It will be appreciated that the sensitivity factor, b, may be selected according to the threshold for identifying reliable and unreliable parameters. For example, if the threshold for reliability is 0.95, the sensitivity factor, b, may be chosen (e.g., b=0.05) such that the independence values are significantly boosted and thus mapped to a large number of bars in the signal-strength indicator when d<0.95.

The graphical indicator generation module 28 generates the graphical indicators that correspond to the independence values for the parameters of the curve fit function. As mentioned above, the graphical indicator may be a signal-strength indicator where the independence value, s, maps to a corresponding number of bars in the graphical signal-strength indicator. For example, the signal-strength indicator may display 0-10 bars to indicate the reliability of the parameter where 0 bars indicates complete unreliability and 10 bars indicates complete reliability. Independence values around 0.1, 0.5, and 0.9 may respectively correspond to one bar, five bars, and nine bars in a signal strength indicator.

The graphical indicator generation module 28 receives the independence values for the curve fit parameters from the parameter independence determination module 26. The graphical indicator generation module 28 may utilize a graphics library to render the graphical indicator 20, which may then be displayed at a display device 16 concurrently with the plotted bioassay dose-response data, the corresponding curve fit 18, and curve fit function parameters.

The graphical indicator generation module 28 in FIG. 1 generates a display signal that may include, for example, a plot of the bioassay dose-response data on a graph and the corresponding curve fit, the estimated values for the parameters of the curve fit function, the standard error for the parameters, the confidence interval for the parameters, and the graphical indicator of parameter independence. The assay data analysis system 12 may be in signal communication with a display device 16 and transmit this display signal to a display device for visual display of this information. The display device 16 receives the display signal and converts it into a visual display for current display of the bioassay dose-response curve, curve fit function information, and graphical indicators of parameter independence.

The display device 16 may be any device capable of converting electrical signals into a visually perceivable form. For example, the display device may be, but is not limited to, a liquid crystal display (LCD), a cathode-ray tube (CRT) display, an electroluminescent display (ELD), a heads-up display (HUD), a plasma display panel (PDP), an organic light emitting diode (OLED) display, a vacuum fluorescent display (VFD), and the like.

Figure 2:
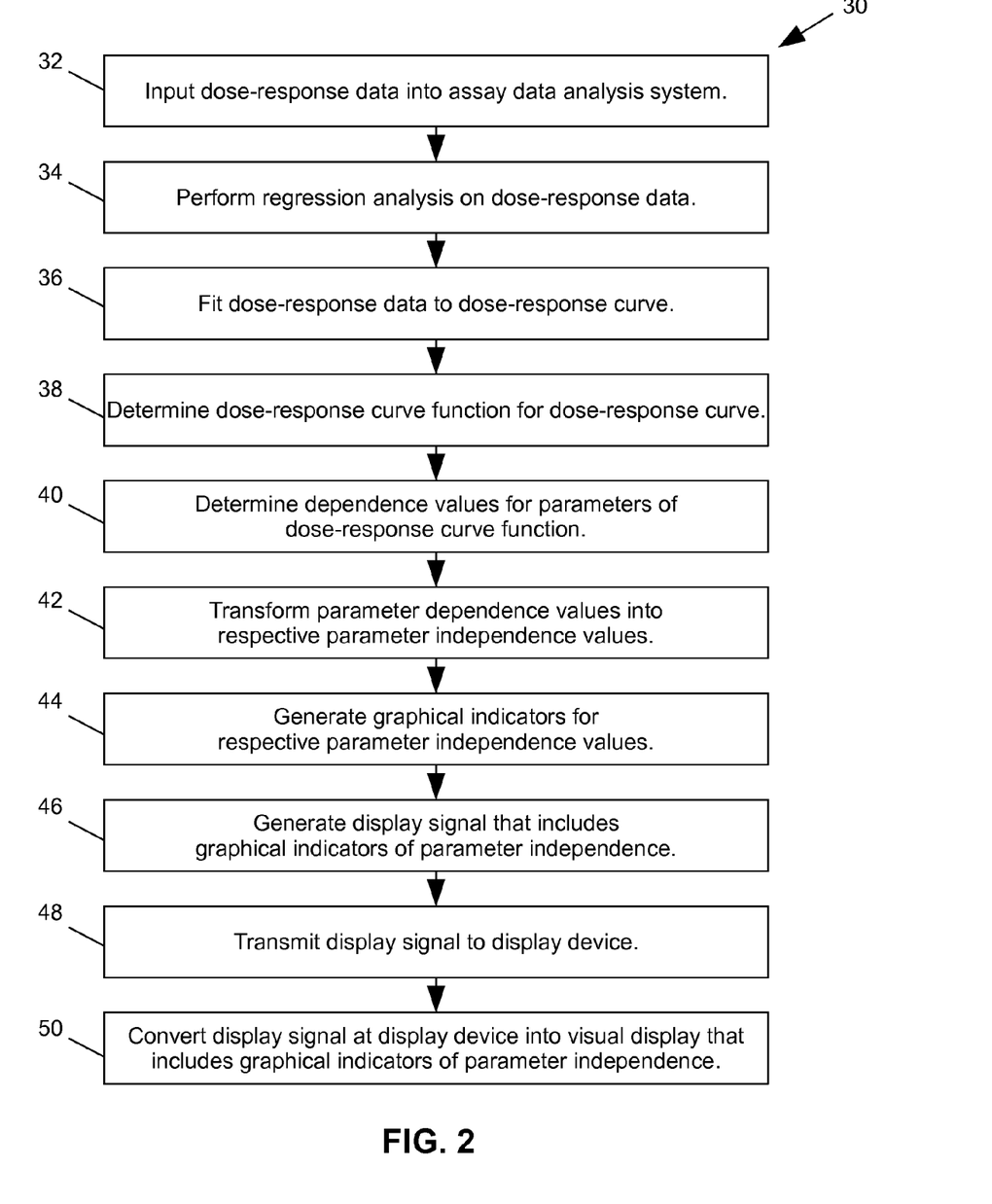
FIG. 2 is an example flowchart of method steps for displaying parameter independence in a data analysis system.

Referring to FIG. 2, an example flowchart 30 of method steps for determining and displaying parameter independence in a data analysis system is shown. At step 32, data is input into the data analysis system; in this example, dose-response data may be input into an assay data analysis system. Then, at step 34, regression analysis is performed on the dose-response data, and the dose-response data is fit to a curve at step 36. A parameterized curve fit function for the dose-response curve is determined for the dose-response curve at step 38. Determining the curve function for the dose-response curve includes estimating the parameters of the curve function and determining the standard error and confidence interval for the parameter values.

At step 40, the dependence values for each parameter of the curve fit function are determined. Then, at step 42, the dependence values are transformed into respective independence values for each parameter. The parameter dependence values and independence values may be determined using the approach discussed above. The independence values are then used to generate a graphical indicator of parameter independence at step 44. As discussed above, the parameter independence value may be mapped to a corresponding number of bars in a signal strength indicator.

A display signal is generated at step 46 that includes the graphical indicators of parameter independence. The display signal may also include a graph of the plot of the dose-response data, the curve for the dose response data, and the estimates, standard errors, and confidence intervals for the parameters of the curve fit function. The display signal is transmitted to a display device at step 48 and converted into a visual display at step 50 to visually display the graphical indicators of parameter independence.

The graphical indicators of parameter independence may alert a researcher that one or more of the parameters has a low independence value and thus may be unreliable. The researcher may then investigate the reason why the parameter has a low independence value and why the parameter is not reliable. For example, the researcher may investigate if there is a problem with the determined curve fit, the dose-response data, or the bioassay itself. The researcher may then take steps to address the low independence values in order to make the parameters more reliable. Researchers may, for example, determine that the curve fit for the bioassay dose-response data is not the "best" fit for the data and fit the data to a different curve. Researchers may also obtain additional bioassay dose-response data or redesign the bioassay itself to address any existing flaws.

Figure 3A:
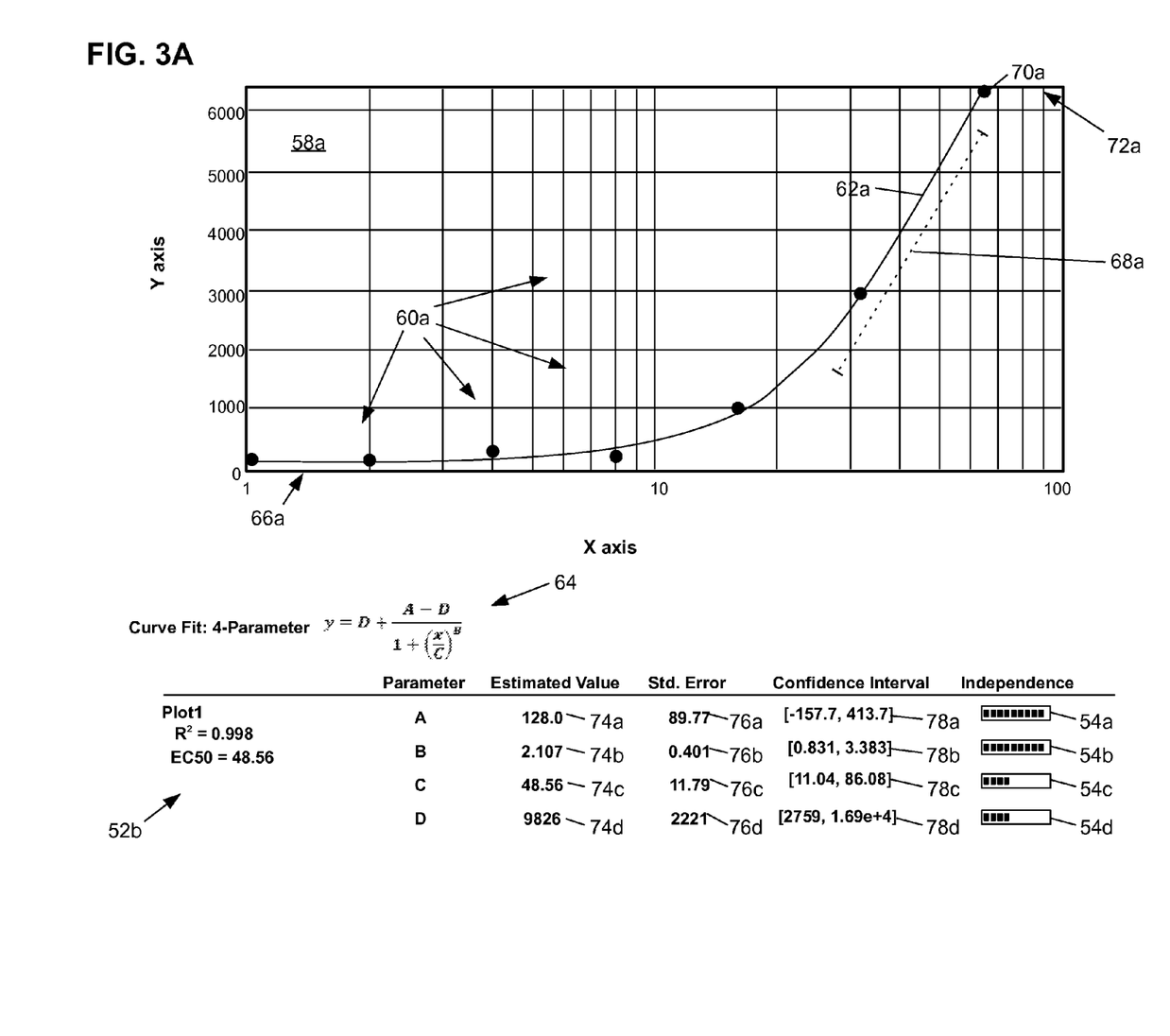
FIG. 3A is a visual display having graphical indicators of parameter independence where the graphical indicators indicate that some parameters have a low independence value.
Figure 3B:
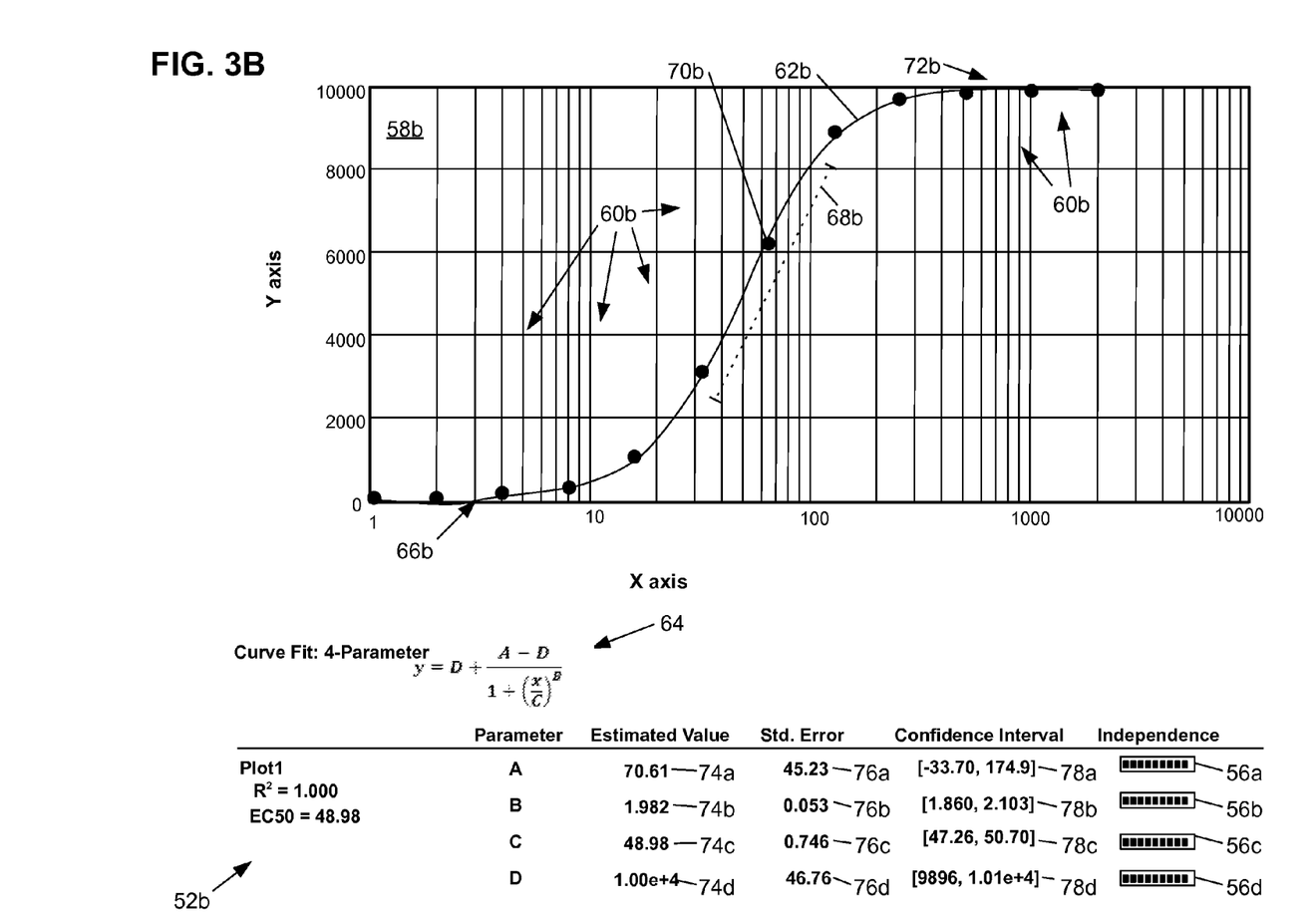
FIG. 3B is the visual display of FIG. 3A where the graphical indicators indicate that all parameters have a high independence value.

FIGS. 3A-B show visual displays 52a-b that include graphical indicators 54a-d and 56a-d for visualizing parameter independence. In FIG. 3A, a graph 58a is shown that plots bioassay dose-response data 60a. A dose-response curve 62a is fit to the plot of the bioassay dose-response data 60a, and a 4PL curve fit function 64 that defines the dose-response curve. As discussed above, the dose-response curve 62a includes various characteristics including: a minimal asymptote 66a for the curve; a slope 68a of the curve; an inflection point 70a for the curve; and a maximal asymptote 72a of the curve. These characteristics respectively correspond to parameters A-D of the curve fit function 64.

The visual display 52a lists the estimated values 74a-d, standard errors 76a-d, and confidence intervals 78a-d for the parameters A-D of the curve fit function 64, which correspond to the characteristics of the dose-response curve 62a. Additionally, the visual display 52a includes graphical indicators 54a-d of parameter independence for each of the parameters A-D respectively. As seen in this example, the graphical indicators 54c and 54d provide a visual alert that the parameter C and parameter D have low independence. As a result, parameters C and D may be unreliable as evidenced by the large values for the standard error 76c and 76d and confidence intervals 78c and 78d.

The unreliability of parameters C and D makes sense when one considers the dose-response data 60a plotted on the graph 58a in this example. The 4PL curve fit function 64 fits the dose-response data 60a to a dose-response curve 62a. The dose-response data 60a in this example does not, however, include enough data points to clearly define the maximal asymptote 72a (upper plateau). Accordingly, the resulting sigmoidal curve fit estimates 74c and 74d for parameters C and D are suspect. The graphical indicators 54c and 54d of parameter independence provide an alert that the curve fit may not be the "best" fit for the dose-response data 60a.

In the visual display 52b of FIG. 3B, the dose-response data 60b has been supplemented to include additional data points that define the maximal asymptote 72b giving the dose-response curve 62b a better sigmoidal shape. As seen in FIG. 3B, adding more data points to the dose-response data 60b has provided a better curve fit for the dose-response data, one that more resembles the expected sigmoidal curve for bioassay dose responses. The maximal asymptote 72b is more clearly defined, and the inflection point 70b is more appropriately positioned near the center of the dose-response curve 62b. In this example, the estimated values 74a-d, standard errors 76a-d, and confidence intervals 78a-d for all parameters of the curve fit function 64 have been recalculated. As seen in FIG. 3B, the standard error 76c and 76d for parameters C and D have been reduced and the confidence intervals 78c and 78d have been narrowed. Parameters C and D provide more reliability in FIG. 3B compared to FIG. 3A. The visual indicators 56c and 56d of parameter independence for parameters C and D reflects the improved reliability by indicating that each parameter has high independence. Thus, researchers may be more confident that the estimated values 74a-d for the parameters A-D of the corresponding curve fit function 64 are reliable.

It will be understood and appreciated that one or more of the processes, sub-processes, and process steps described in connection with FIGS. 1-2 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented with in digital form such as digital circuitry or source code, or in analog form such as analog source such as an analog electrical, sound, or video signal). The instructions may be executed within a processing module, which includes, for example, one or more microprocessors, general purpose processors, combinations of processors, DSPs, or ASICs. Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., an assay data analysis system 12 in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A system for performing a data analysis comprising:
   a processor;
   a curve fit module that determines a curve fit function for a data set generated from a biological assay, wherein a plurality of parameters are associated with the curve fit function, and each parameter is associated with a characteristic of the curve fit function;
   a parameter dependence determination module that determines a plurality dependence values, wherein one dependence value is determined for each of the plurality of parameters associated with the curve fit function;
   a parameter independence determination module that applies a non-linear mapping to each of the plurality of dependence values to develop a plurality of independence values, wherein an independence value is associated with each parameter of the curve fit function; and
   a graphical indicator generation module that generates on a display device associated with the processor a plurality of non-numerical graphical indicators, wherein each graphical indicator is generated in accordance with a respective one of the plurality of independence values, and where the graphical indicator for a particular independence value indicates a degree of independence of the one parameter associated with the particular independence value from other parameters of the plurality of parameters.

2. The system of claim 1, where:
   the data set includes dose-response data generated from a biological assay;
   the curve fit function corresponds to a dose-response curve for the biological assay;
   the dose-response curve is a sigmoidal dose-response curve; and
   the curve fit function includes at least four parameters respectively corresponding to: a minimal asymptote of the dose-response curve; a maximal asymptote of the dose-response curve; an inflection point of the dose-response curve; and a slope factor for the dose-response curve.

3. The system of claim 1, where:
   the data set includes dose-response data generated from a biological assay;
   the curve fit function corresponds to a dose-response curve for the biological assay;
   the dose-response curve is a sigmoidal dose-response curve; and
   the parameter independence determination module determines the independence value using a transformation function to transform the dependence value into the independence value.

4. The system of claim 3 where the dependence value is nonlinearly transformed into the independence value based on a predetermined sensitivity factor that boosts the independence value when the dependence value is above a predetermined threshold.

5. The system of claim 3, where:
   the graphic indicator generation module maps the independence value to the corresponding graphic indicator; and
   the graphic indicator is a signal-strength indicator that displays a number of bars such that the displayed number of bars corresponds to the independence value.

6. The system of claim 3, where:
   the graphical indicator generation module generates a display signal that includes the graphic indicator; and
   the display device displays the graphic indicator concurrently with a plot of the data set on a graph and concurrently with the at least one parameter of the curve fit function.

7. A computer-implemented method for performing a data analysis comprising:
   determining a curve fit function for a data set generated from a biological assay, wherein a plurality of parameters are associated with the curve fit function, and each parameter is associated with a characteristic of the curve fit function;
   determining a plurality of dependence values, wherein one dependence value is determined for each of the plurality of parameters associated with the curve fit function;

applying a non-linear mapping to each of the plurality of dependence values to develop a plurality of independence values, wherein an independence value is associated with each parameter of the curve fit function; and generating a plurality of non-numerical graphical indicators on a display device, wherein one graphical indicator is generated for a respective one of the plurality of parameters, and where the graphical indicator for a particular parameter indicates a degree of independence of the one parameter associated with particular independence value from the other parameters of the plurality of parameters.

8. The computer-implemented method of claim 7, further comprising:
determining a plurality of dependence values that respectively correspond to each of the parameters of the curve fit function;
determining a plurality of independence values that respectively correspond to each of the parameters of the curve fit function; and
generating a plurality of graphical indicators that correspond to each of the parameters of the curve fit function and where the graphical indicators respectively correspond to the independence values for the parameters.

9. The computer-implemented method of claim 7, where:
the data set includes dose-response data generated from a biological assay;
the curve fit function corresponds to a dose-response curve for the biological assay; and
the dose-response curve is a sigmoidal dose-response curve.

10. The computer-implemented method of claim 9, where:
the curve fit function includes at least four parameters respectively corresponding to: a minimal asymptote of the dose-response curve; a maximal asymptote of the dose-response curve; an inflection point of the dose-response curve; and a slope factor for the dose-response curve.

11. The computer-implemented method of claim 9, further comprising transforming the dependence value into the independence value using a transformation function, and where the dependence value is nonlinearly transformed into the independence value based on a predetermined sensitivity factor that boosts the independence value when the dependence value is above a predetermined threshold.

12. The computer-implemented method of claim 11 where the transformation function is:

$$s(d) = (1-d) \times \left(\frac{1+b}{1+b-d}\right)$$

where d is the dependence value, s is the independence value, and b is the sensitivity factor.

13. The computer-implemented method of claim 11 further comprising mapping the independence value to the corresponding graphical indicator where the graphical indicator is a signal-strength indicator that displays a number of bars such that the displayed number of bars corresponds to the independence value.

14. The computer-implemented method of claim 11 further comprising displaying at the display device the graphical indicator concurrently with a plot of the data set on a graph and concurrently with the at least one parameter of the curve fit function.

15. A computer program product for performing data analysis, the computer program product comprises a non-transitory storage medium having instructions stored therein which, when executed by a processor of a computer, cause the computer to:
determine a curve fit function for a data set generated from a biological assay, wherein a plurality of parameters are associated with the curve fit function, and each parameter is associated with a characteristic of the curve fit function;
determine a plurality of dependence values, wherein one dependence value is determined for each of the plurality of parameters associated with the curve fit function;
apply a non-linear mapping to each of the plurality of dependence values to develop a plurality of independence values, wherein an independence value is associated with each parameter of the curve fit function; and
generate a plurality of non-numeric graphical indicators, wherein each graphical indicator is generated in accordance with a respective one of the independence values and where the graphical indicator for a particular independence value indicates a degree of independence of the one parameter associated with the particular independence value from other parameters of the plurality of parameters.

16. The computer program product of claim 15, where the computer program product further causes the computer to determine dependence values that correspond to each of the parameters of the curve fit function; to determine independence values that correspond to each of the parameters of the curve fit function; and to generate graphical indicators that correspond to each of the parameters of the curve fit function where the graphical indicators respectively correspond to the independence values for the parameters.

17. The computer program product of claim 15, where:
the data set includes dose-response data generated from a biological assay;
the curve fit function corresponds to a dose-response curve for the biological assay;
the dose-response curve is a sigmoidal dose-response curve; and
the curve fit function includes at least four parameters respectively corresponding to: a minimal asymptote of the dose-response curve; a maximal asymptote of the dose-response curve; an inflection point of the dose-response curve; and a slope factor for the dose-response curve.

18. The computer program product of claim 15, where: the data set includes dose-response data generated from a biological assay; the curve fit function corresponds to a dose-response curve for the biological assay; the dose-response curve is a sigmoidal dose-response curve; and the computer program product further causes the computer to transform the dependence value into the independence value using a transformation function.

19. The computer program product of claim 18, where the computer program product causes the computer to: map the independence value to the corresponding graphical indicator, the graphical indicator is a signal-strength indicator that displays a number of bars such that the displayed number of bars corresponds to the independence value.

20. The computer program product of claim 18, where the computer program product further causes the computer to display on a display device the graphical indicator concurrently with a plot of the data set on a graph and concurrently with the at least one parameter of the curve fit function.

\* \* \* \* \*